March 9, 1943.   T. G. HARE   2,313,339
METHOD OF WHEEL BALANCING
Filed Sept. 17, 1941   3 Sheets-Sheet 2
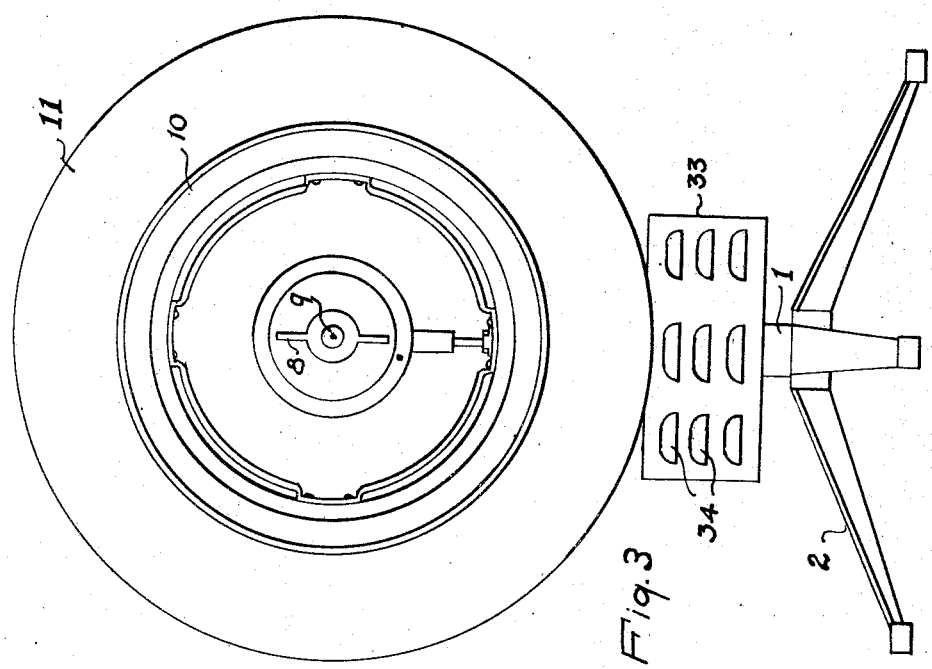
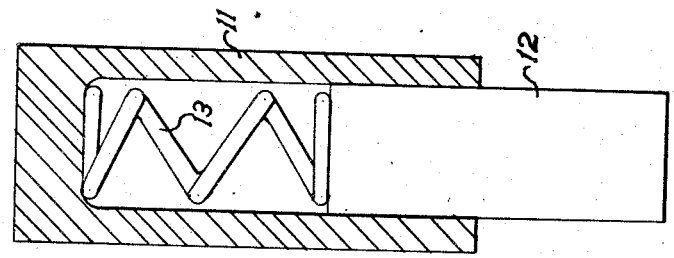
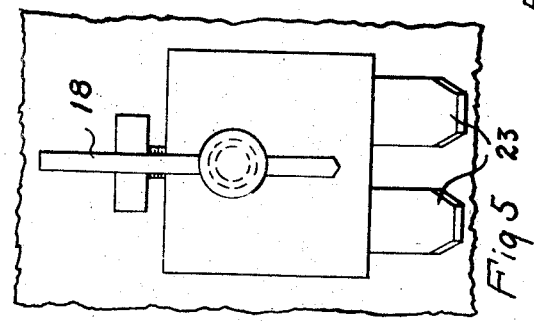
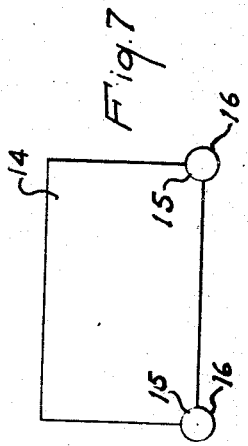
INVENTOR.
TERENCE G. HARE
BY
ATTORNEY March 9, 1943. T. G. HARE 2,313,339
METHOD OF WHEEL BALANCING
Filed Sept. 17, 1941 3 Sheets-Sheet 3
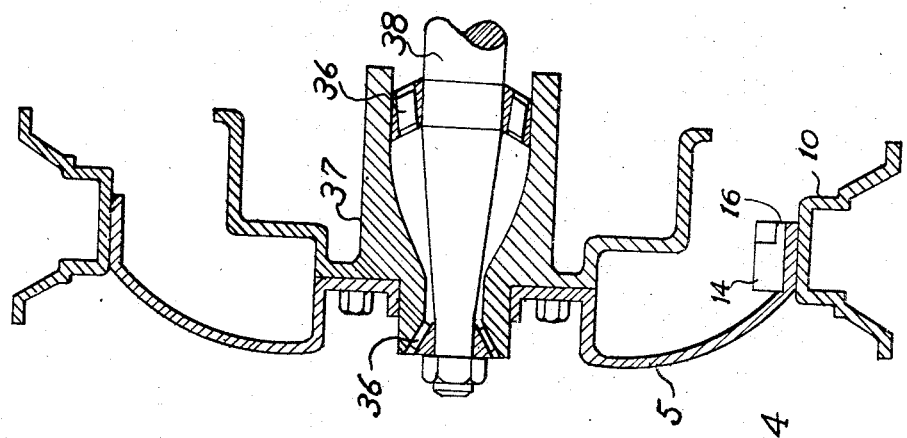
Fig.4
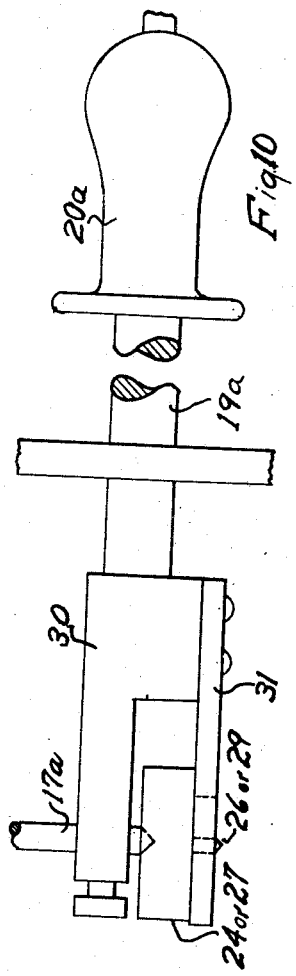
Fig.10
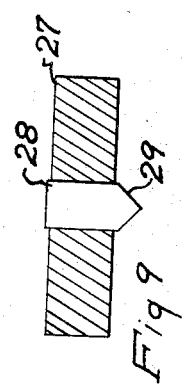
Fig.8
Fig.9
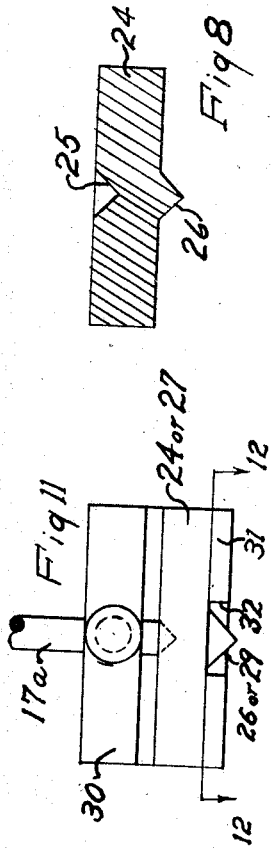
Fig.11
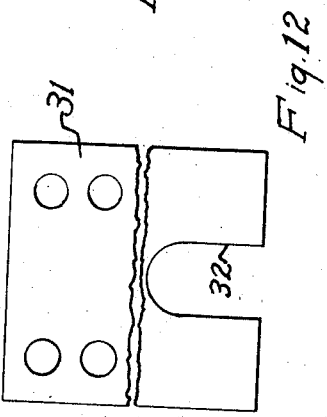
Fig.12
INVENTOR.
TERENCE G. HARE
BY
ATTORNEY Patented Mar. 9, 1943

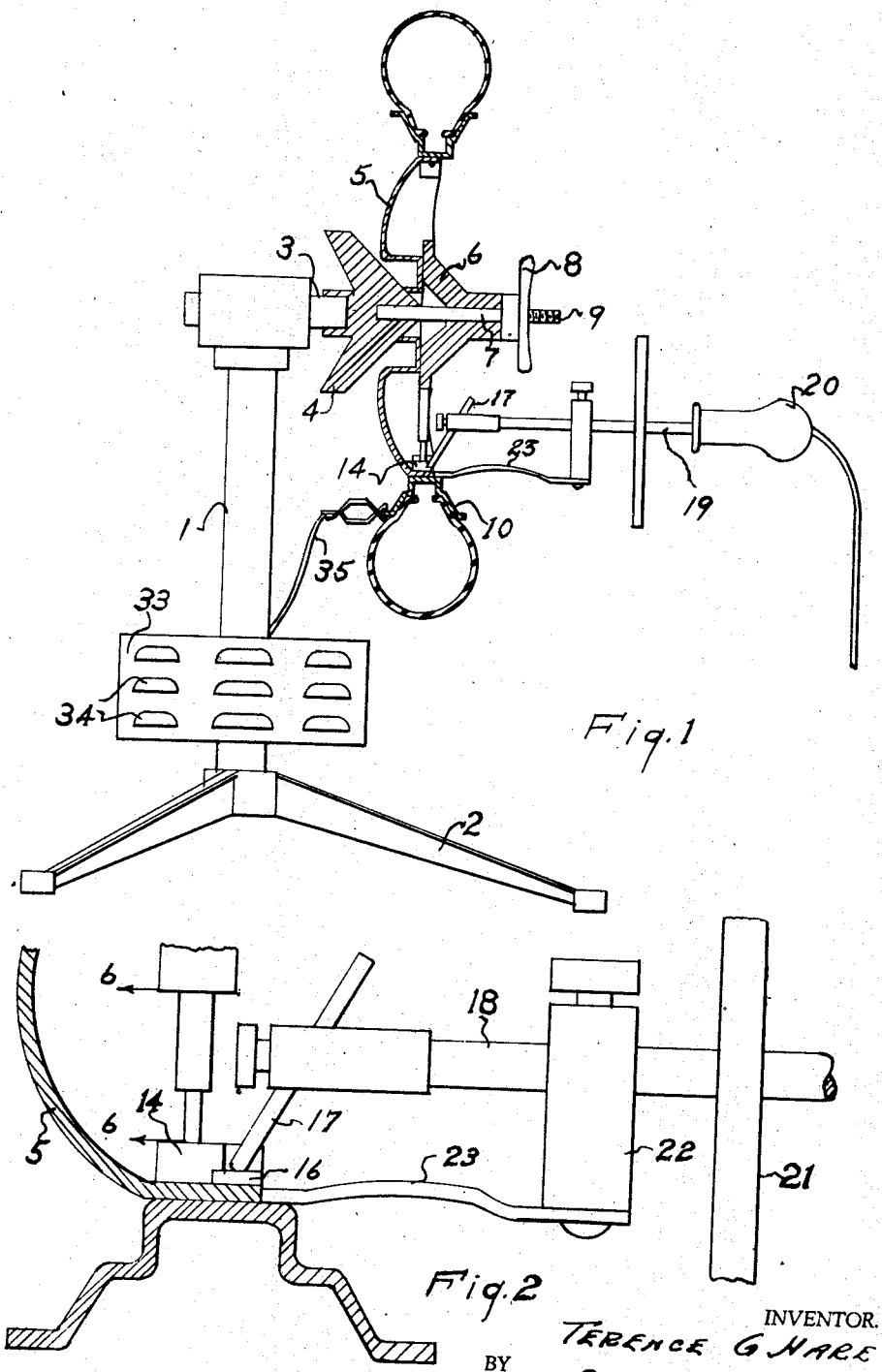

2,313,339

UNITED STATES PATENT OFFICE 2,313,339

METHOD OF WHEEL BALANCING

Terence G. Hare, Ypsilanti, Mich., assignor to The Amesbury Seat Manufacturing Co., Ypsilanti, Mich., a corporation of Michigan Application September 17, 1941, Serial No. 411,252

5 Claims. (Cl. 301—5)

This invention relates to wheel balancing machines and to the method of operating the same to obtain perfect static and dynamic balancing of an automotive wheel having a tire and tube mounted thereon.

It is established practice for a wheel manufacturer to balance wheels but this balance is upset upon the mounting of a tire and tube thereon for the reason that very few tires and no tubes are in balance with respect to their axis of rotation.

It is also established practice to balance the assembly of a wheel having a tire and tube mounted thereon by the application of small weights to the inside edge of the rim. This method gives a static balance, but if dynamic balancing is to be obtained further weights must be employed on the outside of the rim which is not ordinarily done. This method thus is of restricted value and it has the further drawbacks that the weights are unsightly and that they must be made of some special metal such as lead which may not be available during periods of national emergency.

An object of this invention is to teach the welding of counter-balancing weights to a rim without the removal of the tire and tube therefrom.

Another object is to teach the application of such weights at points which will not throw the wheel out of balance dynamically when it is balanced statically.

A further object is to teach the counterbalancing of the wheel, tire and tube by welding an ordinary low carbon steel weight to the inside of a wheel, thereby employing a common material and removing it from the view of all but repairmen.

Another object is to provide an improved wheel standard upon which a wheel with its tire and tube may be rotatably mounted in order to find the extent of the need for counterbalancing, this standard being characterized by the incorporation of welding equipment which is exactly suitable for affixing the above described weights to the wheel.

A further object is to provide a combination wheel standard and welding equipment capable of making a rapid and brittle weld of a weight to a wheel, the weld having sufficient strength to retain the weights but so brittle as to fracture under the impact of a tool such as an ordinary hammer.

A still further object is to provide a welding torch for manual manipulation which as a resilient spacer means secured thereto to assure the application of welding current at the exact point desired.

Other objects and advantages will become more fully apparent as reference is had to the accompanying drawings wherein by invention is illustrated, and in which Fig. 1 is an axial cross section through a wheel mounted on my improved wheel balancing machine, Fig. 2 is an enlarged detail view, as shown in Fig. 1, of a rim cross section, a portion of the wheel disc, a counterbalancing weight and a torch, Fig. 3 is a front elevation of the assembly of Fig. 1, Fig. 4 is an axial cross section through a wheel and rim mounted on a vehicle axle, Fig. 5 is a top plan view of the electrode carrying end of the torch of Fig. 1, Fig. 6 is a longitudinal section through the trial weight shown in Fig. 2, taken along the line 6—6 of Fig. 2, Fig. 7 is a top plan view of my improved counterweight, Figs. 8 and 9 are vertical sections taken through modified forms of the counter-weight, Fig. 10 is a side elevation of a modified form of welding torch, Fig. 11 is a frontal view of Fig. 10, and Fig. 12 is a plan view of the work holder and rest attached to the torch, taken along the line 12—12 of Fig. 11.

More particularly, 1 indicates the standard of a wheel balancing machine having legs 2 serving as the supporting base. Rotatably mounted in the top of the standard 1 is a composite axle composed of an axle shaft 3 and a conical abutment 4 against which a wheel 5 abuts and against which the wheel is firmly held by a cap 6. The cap 6 has a guide shaft or dowel 7 for insertion into a hole axially of the cone 4 and a nut 8 screws onto the threaded extension 9 thereof.

The wheel 5 has a rim 10 fixedly secured thereto and a pneumatic tire 11 with its usual tube is mounted on the rim 10, fully inflated.

A slight free rotation of the wheel 5 and axle 3 will usually reveal that the wheel assembly is out of balance, the heaviest portion always seeking the lowest level. At a point directly opposite the heaviest portion a trial weight is illustrated in Figure 6 in which a cylindrical body portion 11 has a plunger 12 therein and a spring 13 opposing movement of the plunger inwardly of the bore of the body portion 11. The length of the trial weights is such that insertion of them between the periphery of the cap 6 and the rim 10 compresses the spring 13 thus holding the weight in place. One of these weights is inserted between the periphery of the cap 6 and the rim 10 and the wheel again tested for balance. If the trial weight is too heavy or too light a trial weight of different weight is tried until one is found which exactly balances the wheel statically.

The weight of the trial weight is known and a permanent weight 14 is then selected to correspond to the trial weight and inserted between the trial weight and the rim, thus compressing the spring 13 still further. The weight is then welded in place.

The weight 14 is preferably made in such manner that a weld may be made between it and the wheel over a small area and for this purpose the weight may be made in either one of several ways now to be described. Thus, Fig. 7 shows a rectangular piece of metal, preferably low-carbon steel, in which one or more corners 15 have been thinned down as by shearing for a substantial depth to flatten out the portions 16. These thin portions 16 are contacted with the electrode 17 secured to an electrical conductor 18 of a welding torch indicated generally by the numeral 19 and having a hand grip 20. A shield 21 may also be provided as a protector for an operator and along the length of the conductor 18 is a work holder and rest support 22 of electrically non-conductive material. Two arms 23 of spring material are secured to the support 22 and project outwardly in the direction of the end of the electrode 17. The torch 19 is thus positioned on the work and when depressed against the resiliency of the arms 23 the electrode 17 contacts the thin portions or ears 16 of weight 14. A high frequency current circuit is closed by this contact and a portion of the ear 16 is melted into the wheel 5 thus forming a brittle weld which can easily be fractured by a blow from a hammer, and which is formed so quickly than the heat will not be sufficient in the rim to injure an inflated tire and tube mounted on the rim.

Another form of weight is illustrated at 24 in Fig. 8, in which a piece of metal, preferably steel, and which may be rectangular in shape similar to the weight 14. This weight has a depression 25 formed by an impact from a punch or other tool which causes a projection 26 to bulge from the opposite side thereof. This depression serves a purpose similar to the thin portions 16 of the weight 14 in that the current flow will be concentrated on the small area 26, particularly if that area is the only contact between the weight 24 and the wheel as may be effected as hereinafter described.

Another form of weight is shown at 27, Fig. 9, in which a hole is provided in the weight and a separate piece of metal 28, welding rod for instance, may be driven into the hole with the end 28a thereof projecting outwardly. The rod 28 has a driving fit with its hole.

In order to position these weights 24 or 27, and particularly if the spring holder 11, 12 is not available, I prefer to employ a modified form of work holder and torch rest as is illustrated in Figs. 10, 11 and 12. The torch generally indicated as 19a has a handle 20a through which an electrical conductor 18a passes and which terminates in an electrode holder 30 for an electrode 17a. A work holder and torch rest 31 is secured to the bottom of the electrode holder. This work holder and rest 31 is made of electrically non-conductive material, is preferably resiliently flexible so that it will spring somewhat as a weight 24 or 27 is inserted, and is slotted as indicated at 32, Figs. 11 and 12. The thickness of the part 31 is less than the depth of the projections 26 or 29 so that when the weight 24 or 27 is inserted between the part 31 and the electrode only the tip 26 or 29 will contact the wheel 5 and hence current flow will be concentrated at this point.

It will thus be seen that the torches 19 and 19a with their special work holder and torch rest are designed particularly for this wheel balancing standard and that, since welding rod is not used and since, contrary to conventional practice, a brittle weld is desired, the transformer to give the desired current frequency is also special to this equipment it is incorporated in the standard I as illustrated at 33. The transformer may thus be located above the floor, it may be given the correct ventilating louvres 34 for its single job and the connection 35 therefrom to the rim 10 may be short and of maximum safety.

The placement of the weight on the inside of the wheel 5, as illustrated in Figs. 1, 2 and 3 permits location midway between the bearings 36 of the wheel when it is assembled for use on a hub 37 and an axle 38. Thus, a proper static balance is, automatically, a proper dynamic balance.

What I claim is:

1. The method of counterbalancing a wheel having a rim, a tire and a tube on said rim which consists in locating and in measuring the amount which the assembly is out of static balance, in placing a steel weight having a small area projection on said wheel inwardly of said rim intermediate the bearings of said wheel whereby a correction for static balance will also correct for dynamic balance, in electrically insulating a portion of said weight from that part of the wheel to which it is to be welded whereby the small area projection contact remains, and in directing an electrical current through said small area and into the wheel thereby melting said weight at said small area onto said wheel to form a small brittle weld therebetween.

2. The method of counterbalancing a wheel assembly including a rim, a tire and a tube on said rim which consists in locating the point at which the assembly is heaviest, in inserting between the hub and said rim one or more spring pressed trial weights at a point diametrically opposite the heaviest point thereby determining the amount of the out-of-balance of said assembly, in then inserting a weight between said spring pressed trial weight and said rim whereby said trial weight retains said weight in position and in directing a high frequency current through a localized area of said weight whereby a portion thereof is melted onto said wheel.

3. The method of balancing a wheel, having a body portion, a rim portion with a substantially axially extending internal circumferential surface and a tire mounted on the rim, which comprises rotatably mounting the wheel at its center, balancing the wheel by applying thereto one or more trial weights of known value, substituting one or more metal weights of the same value for the trial weights and placing them on the internal circumferential surface of the rim and then making a frangible weld connection between the one or more metal weights and the rim.

4. The method of balancing a wheel, having a body portion, a rim portion with a substantially axially extending internal circumferential surface and a tire mounted on the rim, which comprises mounting the wheel at its center on a rotatable hub element, balancing the wheel by applying one or more spring extensible trial weights of known value compressed and inserted between the hub element and the wheel rim, selecting one or more metal weights of the same value to be substituted for the trial weights, placing the one or more metal weights on the internal circumferential surface of the rim so as to lie between the rim and an extensible part of the trial weight to be held in position thereby, making a frangible weld connection between the one or more metal weights and the rim and then removing the one or more trial weights.

5. The method of balancing a wheel having a metal disk-like body portion and a metal rim portion with a tire mounted thereon, which comprises rotatably mounting the wheel at its center, balancing the wheel by applying thereto one or more trial weights of known value, substituting one or more metal weights of the same value for the trial weights and placing them in surface to surface contact with a metal surface of the wheel and then making a frangible weld connection between the one or more metal weights and the wheel.

TERENCE G. HARE.